(12) United States Patent
Bordewieck et al.

(10) Patent No.: US 10,664,879 B2
(45) Date of Patent: May 26, 2020

(54) ELECTRONIC DEVICE, APPARATUS AND SYSTEM

(71) Applicant: Sony Corporation, Tokyo (JP)

(72) Inventors: Aurel Bordewieck, Stuttgart (DE); Fabien Cardinaux, Stuttgart (DE); Wilhelm Hagg, Stuttgart (DE); Thomas Kemp, Stuttgart (DE); Stefan Uhlich, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 291 days.

(21) Appl. No.: 15/632,863

(22) Filed: Jun. 26, 2017

(65) Prior Publication Data

US 2018/0012267 A1 Jan. 11, 2018

(30) Foreign Application Priority Data

Jul. 7, 2016 (EP) .................................... 16178498

(51) Int. Cl.
| | | |
|---|---|---|
| *G06Q 30/02* | (2012.01) | |
| *G06Q 10/08* | (2012.01) | |
| *G06Q 20/20* | (2012.01) | |
| *G06Q 30/06* | (2012.01) | |
| *G07G 1/00* | (2006.01) | |
| *G06F 16/00* | (2019.01) | |
| *G06Q 20/32* | (2012.01) | |

(52) U.S. Cl.
CPC ......... *G06Q 30/0281* (2013.01); *G06F 16/00* (2019.01); *G06Q 10/087* (2013.01); *G06Q 20/20* (2013.01); *G06Q 20/32* (2013.01); *G06Q 30/06* (2013.01); *G07G 1/0045* (2013.01)

(58) Field of Classification Search
CPC ........ G06Q 30/06; G06Q 30/00; G06Q 30/02; G06Q 20/40; G06F 21/52
USPC ................................ 705/26.61, 7.34; 726/22
See application file for complete search history.

(56) References Cited

U.S. PATENT DOCUMENTS

| | | | |
|---|---|---|---|
| 9,595,062 B2 * | 3/2017 | Goulert .............. | G06Q 30/0633 |
| 9,747,631 B2 * | 8/2017 | Paradise ................ | G06Q 30/02 |
| 2011/0282821 A1 * | 11/2011 | Levy ................... | G06Q 30/0631 |
| | | | 706/47 |
| 2013/0173435 A1 | 7/2013 | Cozad, Jr. | |
| 2014/0223553 A1 * | 8/2014 | Gupta ..................... | G06F 21/52 |
| | | | 726/22 |
| 2015/0066700 A1 * | 3/2015 | Boss .................. | G06Q 30/0623 |
| | | | 705/26.61 |
| 2015/0262197 A1 * | 9/2015 | Chao ..................... | H04W 4/029 |
| | | | 705/7.34 |

(Continued)

FOREIGN PATENT DOCUMENTS

EP      2 806 384 A1   11/2014

*Primary Examiner* — Olusegun Goyea
(74) *Attorney, Agent, or Firm* — Xsensus LLP

(57) ABSTRACT

An electronic device has a display and a circuitry. The circuitry is configured to obtain location information of a specific item of multiple items located in an environment, wherein the location information of the specific item is obtained based on a correlation between location tracking information of electronic devices moving in the environment and item list data representing items of the multiple items being purchased by users of the electronic devices for which the location tracking information has been provided; and display an indication of the location of the specific item on the display.

18 Claims, 4 Drawing Sheets

(56) References Cited

U.S. PATENT DOCUMENTS

2016/0232533 A1* 8/2016 Glaser .................... G06Q 40/02
2017/0169444 A1* 6/2017 Housholder ....... G06Q 30/0201
2017/0193593 A1* 7/2017 Na ..................... G06Q 30/0639

* cited by examiner

US 10,664,879 B2

ELECTRONIC DEVICE, APPARATUS AND SYSTEM

TECHNICAL FIELD

The present disclosure generally pertains to an electronic device, an apparatus and a system for providing a guide to a location of an item.

TECHNICAL BACKGROUND

Generally, it is known to provide location information of items in a shop to a user, such that the user can easily find a product in a shop.

A simple known approach for providing the location information is to use a map including positions of the items offered by the shop. This requires that the shop owner keeps the position information of each item up-to-date, which can be cumbersome, in particular when the shop layout or the product location changes.

Although there exist techniques for providing location information of items, it is generally desirable to improve electronic devices, apparatus and systems in that regard.

SUMMARY

According to a first aspect, the disclosure provides an electronic device comprising a display and circuitry, the circuitry configured to obtain location information of a specific item of multiple items located in an environment, wherein the location information of the specific item is obtained based on a correlation between location tracking information of electronic devices moving in the environment and item list data representing items of the multiple items being purchased by users of the electronic devices for which the location tracking information has been provided; and display an indication of the location of the specific item on the display.

According to a second aspect, the disclosure provides an apparatus comprising circuitry, the circuitry configured to collect location tracking information from multiple electronic devices moving in an environment; collect item list data representing items of the multiple items which have been purchased by users of the electronic devices for which the location tracking information is collected; and obtain location information of a specific item represented by the item list data by correlating the location tracking information with the item list data.

According to a third aspect, the disclosure provides a system, comprising multiple client electronic devices comprising a display and circuitry, the circuitry configured to obtain location information of a specific item of multiple items located in an environment, wherein the location information of the specific item is obtained based on a correlation between location tracking information of electronic devices moving in the environment and item list data representing items of the multiple items being purchased by users of the electronic devices for which the location tracking information has been provided, and display an indication of the location of the specific item on the display; and a server apparatus comprising circuitry, the circuitry configured to collect location tracking information from the multiple client electronic devices moving in the environment collect item list data representing items of the multiple items which have been purchased by users of the electronic devices for which the location tracking information is collected; obtain location information of a specific item represented by the item list data by correlating the location tracking information with the item list data, and provide the location information to the client electronic devices.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
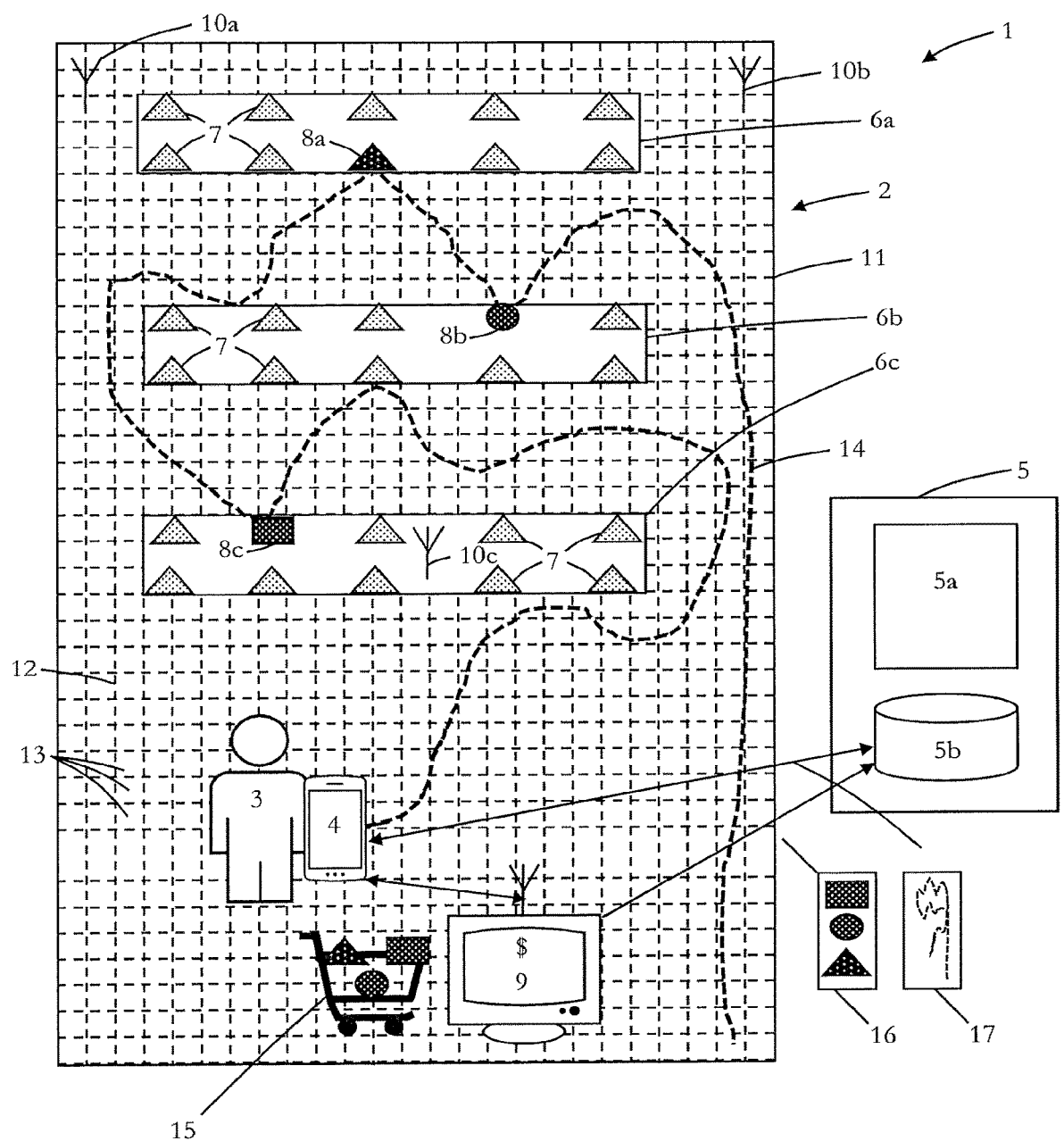
FIG. 1 illustrates a system for providing a shop guide.

Before providing a detailed description of the embodiments under reference of FIG. 1, general explanations are made.

As mentioned in the outset, generally, it is known to provide location information of items in a shop to a user, such that the user can easily find a product in a shop. As discussed, a simple known approach uses a map including positions of the items offered by the shop, which requires that the shop owner keeps the position information of each item up-to-date.

It has been recognized that, typically, in order to guide a user toward a specific item in a shop, a system needs to know at least location of items in the shop or similar environment.

Consequently, some embodiments pertain to an electronic device comprising a display and circuitry, the circuitry configured to obtain location information of a specific item of multiple items located in an environment, wherein the location information of the specific item is obtained based on a correlation between location tracking information of electronic devices moving in the environment and item list data representing items of the multiple items being purchased by users of the electronic devices for which the location tracking information has been provided; and display an indication of the location of the item on the display.

The electronic device can be, for example, a mobile device, a smartphone, a wearable device (digital glasses, digital watch, digital wrist band, or the like), a laptop computer, etc.

The display can be any type of display and can be based, for example, on the cathode tube ray technology, liquid crystal display technology, light emitting diode technology, organic light emitting diode technology, etc. The display can also have a touch sensitive surface and can be a touch display.

The circuitry may include a processor, but also further electronic and electric components, which are needed to implement the features described herein.

The environment may be predefined and it may be a specific area of a building (e.g. house, warehouse, or the like). The specific area may include the whole building or parts of it, e.g. a floor or an area, where a shop is located.

The location information may include location data, map data, or the like and it may include an absolute information, e.g. based on GPS (global positioning system) coordinates or the like, or it may include an indirect or relative location information which gives, for example, a distance to a known object in the environment or the like.

The items may be any type of physical object and the items are, in some embodiments, products or articles which are typically sold in a shop.

The location information can be obtained, for example, by receiving it from a remote apparatus, such as a server, which may obtain the location information based on a correlation between location tracking information of electronic devices moving in the (predefined) environment and item list data representing items being purchased by users of the electronic devices for which the location tracking information has been provided. In other embodiments, the location information is obtained by the circuitry performing this correlation between the location tracking information and the item list data. This correlation will be described in more detail below.

In the (predefined) environment, multiple electronic devices may be located and move around. The multiple electronic devices may or may not move at the same time in the (predefined) environment and they may or may not be present at the same time in the (predefined) environment. The location tracking information may be obtained for each of the multiple electronic devices moving in the (predefined) environment. The location tracking information may include a set of location data representing a "trace" or "track" of a respective electronic device, which has been located at different locations in the (predefined) environment during movement in the (predefined) environment. Hence, in some embodiments, the location tracking information is specific for each of the multiple electronic devices, and, for example, for each of the multiple electronic devices a respective set of location data may be included in the location tracking information. The electronic devices for which the location tracking information is collected may be a mobile device, a smartphone, a wearable device (digital glasses, digital watch, digital wrist band, or the like), a laptop computer, etc. The electronic devices for which the location tracking information is collected may also be a respective tracking device, which is specifically configured to provide location information or which is specifically configured to be tracked by a location tracking system. In such embodiments, the electronic device may be rather simple, e.g. it may be a RFID chip or the like which is detected by respective RFID scanners located in the (predefined) environment, whereby the location tracking system may obtain the location tracking information. Such specific tracking electronic devices may be handed out to customers which enter the (predefined) environment (e.g. the shop or the building where a respective shop is located, etc.).

The item list data represent items which have been purchased by users of the electronic devices for which the location tracking information has been provided. For example, a user moving around with the electronic device in the (predefined) environment will visit different locations in the (predefined) environment and will purchase items of the multiple items which are located in the (predefined) environment. The user will visit a point-of-sale in the (predefined) environment for paying the purchased items. At the point-of-sale, the items which are purchased and payed may be registered, e.g. by scanning a respective bar code with a bar code scanner or the like, as it is generally known. Thereby, a list of items and, thus, respective item list data may be obtained. For each user having purchased respective items respective item list data may be obtained and provided.

An indication of the location of the specific item is displayed on the display. The indication can be, for example, a graphical indication indicating a direction in which the specific item is located, based on a current location of the electronic device. The indication may include a graphical representation of the specific item, which may have a predetermined color, shape, or behavior (blinking or the like) for indication that this is the specific item. The indication may also include a description or the like or the specific item.

Hence, in some embodiments, an indoor localization, e.g. via a Bluetooth connection, Near Field Communication, WiFi-measurements, magnetic measurements, dead reckoning or the like or via other indoor positioning techniques, of the electronic devices is used and a collaborative approach is used: displacements/movements of users using the electronic devices are tracked and, for example, a respective application running on the electronic devices is used and lists of the items the user purchased are collected. Over time, it is possible to obtain a location of a specific item by correlating the location tracking information and the item list data, since from the correlation of many users which have purchased the specific item and visited the same location in the (predefined) environment it can be concluded that the specific is likely at the location which has been visited by many users over time and which has purchased the respective item. As mentioned, the users' shopping can be automatically entered, e.g. by integrating a respective function in a shop cash register or the like which then may provide respective item list data representing a list of items which are purchased by a respective user, i.e. items which have been chosen by a user among the multiple items located in the (predefined) environment.

In some embodiments, the circuitry is further configured to determine the location of the electronic device. The circuitry may include a means which is adapted to determine the location. Such means may include, for example, a GPS sensor or the like. In other embodiments, a location may be determined based on a time of flight measurement, e.g. made with the time of flight camera or the like which is comprised in the means, or by communicating with an indoor position system or the like.

In some embodiments, the circuitry is further configured to display the location of the electronic device on the display. The location of the electronic device may be displayed with a graphical symbol, with a description or the like. By displaying an indication of the location of the specific item and displaying the location of the electronic device, the user can easily orient himself with respect to the specific item in the (predefined) environment.

In some embodiments, the circuitry is further configured to transmit location tracking information to a server. Hence, if the electronic device tracks the location of the electronic device it may transmit this location tracking information to a server, which performs, for example, the correlation between the location tracking information and the item list data, as mentioned above. The location tracking information may be periodically transmitted to the server or it may be triggered by a certain event. For example, the circuitry may recognize that itself (and the user) is at the point of sale and could transmit in response to that the location tracking information to the server. The circuitry may comprise a network interface or the like (local area network interface, wireless interface, or the like) for communicating with a network to which also the server is connected and/or to which, for example, the point-of-sale device is connected.

In some embodiments, the circuitry is further configured to obtain a map of the (predefined) environment and to display the map on the display. The map of the (predefined) environment may include map data which can represent a two-dimensional or three-dimensional representation of the (predefined) environment. Displaying the map assists the user of the electronic device may in finding the specific item. The map may be pre-stored in the electronic device, it may be provided by the server and/or it may be downloadable from an internet resource or from a shop server, etc.

In some embodiments, the user can define the specific item for which an indication of its location shall be displayed.

In some embodiments, the electronic device described above is a client.

In some embodiments, the circuitry is further configured to display a probability that a specific item is located at a specific location in the (predefined) environment. The probability may be obtained by receiving it from the server or performing respective calculations as explained further below.

Some embodiments pertain to an apparatus, which may act as a server, comprising circuitry, the circuitry configured to collect location tracking information from multiple electronic devices moving in a (predefined) environment; collect item list data representing items of the multiple items which have been purchased by users of the electronic devices for which the location tracking information is collected; and obtain location information of a specific item represented by the item list data by correlating the location tracking information with the item list data.

The electronic devices from which the location tracking information is collected may be electronic devices as discussed above and they may be clients, as discussed above.

The location tracking information may be provided by the electronic devices, as discussed and/or by a location tracking system or the like which tracks location of the electronic devices and transmits the location tracking information to the apparatus.

As mentioned, the item list data may be provided, e.g. by a point of sale apparatus or the like which recognizes the items purchased by a user of an electronic device.

The circuitry obtains location information of a specific item represented by the item list data by correlating the location tracking information with the item list data, as also indicated above.

In some embodiments, the circuitry is further configured to provide the location information to a client electronic device, as discussed. This can be done, for example, over a network connection (local area network, wireless network, internet, etc.).

In some embodiments, the circuitry is further configured to analyze the location tracking information.

As mentioned, if there is a single location in the shop that is shared by all users who have purchased a specific item, it can be deduced that the specific item can be found at this particular location. In some embodiments, ambiguities may remain, but then the location of a specific item may be predicted with some degree of confidence.

The analysis of the location tracking information may include the analysis which locations are common in the collected location tracking information, i.e. which location has been passed through or visited by users using the electronic device for which the location is tracked.

The analysis may include analyzing, where, i.e. at which location, a user using the electronic devices has stayed ("stopped") for a predetermined time period. The predetermined time period may be also a time range which is typically needed to search and take a specific item in a shop. Thereby, for example, short and long stops which may occur due to other reasons than shopping may be sorted out. For example, cases where the user just wanted to take a look for something without purchasing it ("short stop") or where the user met another user which is known to him and talks some time with him ("long stop") may be sorted out.

The analysis may also include detecting a change in a movement direction. Thereby, for example, events may be detected where the user was at the wrong location in order to get the specific item.

In some embodiments, the circuitry is further configured to calculate a probability of the location of the specific item. The probability or a "score" may also be output for the specific item and locations of the (predefined) environment and may transmitted to a client electronic device which may display them accordingly. Also a subset of the full probability/score matrix may be output by providing the outputs with the highest confidence or even, for example, only the most likely location for each specific item.

The circuitry may be configured to calculate the probability based on the formula:

$$S_i(l) = \frac{P(i, l)}{P(i)P(l)} = \frac{C(i, l)}{C(l)} \cdot \frac{C(.)}{C(i)}$$

wherein $S_i(l)$ is the probability of a location of the specific item i, $P(i,l)$ is the probability that a user purchases the specific item i and passes the location l, $P(i)$ is the probability that a user purchases the specific item i, $C(i,l)$ is the number of users having purchased the specific item i and having passed the location l, $C(i)$ is the number of users having purchased the item i, $C(l)$ is the number of users having passed the location l, and $C(.)$ is the total number of users.

The term "user" may not be understood in the sense that the identity of the user or the electronic device used by him is obtained, but the term "user" shall only be understood in some embodiments as a user visit in the (predefined) environment. Hence, in the case a user visits the (predefined) environment more than one time, e.g. twice, and purchases a specific item twice, this event will also be taken into account twice, i.e. $C(i)$ will be incremented twice.

In some embodiments, the circuitry is further configured to calculate the most probable location of the specific item i based on the formula:

$$\operatorname{argmax}_l \frac{C(i, l)}{C(l)}$$

Hence, in some embodiments, the most probable location is obtained as the location information and transmitted to a client electronic device which then displays a respective indication of the location of the specific item in the (predefined) environment.

As mentioned, in some embodiments further parameters are included in the calculation of the probability of a location, such as location information about locations where users have stopped or the locations where users have changed their movement direction. Moreover, further parameters such as the possibility for two individuals doing shopping together and having different location tracking information but the same list of purchased items (item list data), etc. may be taken into account.

In some embodiments, the circuitry is further configured to obtain a map of the (predefined) environment. As mentioned, the map may be a two- or three-dimensional map and the location tracking information and the location information may be two-dimensional or three-dimensional.

In some embodiments, the circuitry is further configured to map a grid onto the map, thereby dividing the map into a plurality of map cells. Thereby, for example, the location tracking information may be analyzed and it may be determined (by the server apparatus or the client electronic device) which of the map cells were visited during the visit of the user with the electronic device in the (predefined) environment. Hence, in some embodiments, the circuitry is further configured to determine in which map cells a specific electronic device has been located, based on the location tracking information. The size of the map cells and the grid size may be specified, based on, for example, the particularities of the (predefined) environment and/or the size of the items which are located in the (predefined) environment. The map and/or the map cells may be two- or three-dimensional. In case of a three-dimensional map the map cells may be cubic, for example. For obtaining height information, a user may wear the electronic device at his wrist of the hand with which he will typically get the specific item. The electronic device at the wrist may be configured to determine a height, such that the location tracking information also includes a height, such that also the height in which items are located in the (predefined) environment can be determined.

Some embodiments pertain to a system including multiple client electronic device including a display and a circuitry, as discussed above. The circuitry is configured to obtain location information of a specific item of multiple items located in a (predefined) environment, wherein the location information of the specific item is determined based on a correlation between location tracking information of electronic devices moving in the (predefined) environment and item list data representing items being purchased by users of the electronic devices for which the location tracking information has been provided, and display an indication of the location of the specific item on the display, as discussed above. The system includes a server apparatus including a circuitry, as discussed above. The circuitry of the apparatus is configured to collect location tracking information from the multiple client electronic devices moving in the (predefined) environment; collect item list data representing items of the multiple items which have been purchased by users of the electronic devices for which the location tracking information is collected; obtain location information of a specific item represented by the item list data by correlating the location tracking information with the item list data, and provide the location information to the client electronic devices.

The system may further include a point-of-sale device which is configured to provide the item list data to the server apparatus, as already discussed above.

The system may also include an indoor positioning or tracking system which is configured to track location of the multiple electronic devices in the (predefined) environment and to provide the location tracking information to the server apparatus.

The item list data of items purchased by a user may be obtained at the point of time when the user pays for the purchased items, as already discussed above.

In some embodiments, the item list data and the location tracking information is to be linked to each other. This can be done, for example, with a specific device, e.g. with the point-of-sale device, which is adapted to communicate with the electronic device providing the location tracking information and/or with the indoor positioning system which provides the location tracking information. The communication may be performed over a network connection (local area network, wireless network, internet, etc.), over a Bluetooth connection, infrared connection, etc.

In some embodiments, a client identification or profile, e.g. provided based on a loyalty or discount membership or membership card may be linked to the location tracker (e.g. the electronic device) and the shopping list (item list data). Many shops already link items shopped to client identification such that this information, e.g. being stored in a database, data may be used.

In some embodiments, the link between the item list data and the location tracking information may be obtained by looking at the location of the location tracker (e.g. electronic device) exactly at the time of purchase of the item(s). Hence, if, for example, the electronic device for which the location is tracked is just in front of the cashier or point-of-sale device exactly at the point of time where the specific item is scanned (i.e. determined to be purchased at the point of sale device), the tracked location can be linked to the respective item, whereby the item list data linked to the location tracking information can be obtained.

The features which are described herein for the electronic device, the apparatus and the system may also be part of a respective method for controlling the electronic device, the apparatus and the system.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

With the proposed system, it is possible in some embodiments to infer item locations in a shop without any additional manual effort or additional task to the shop owner, the client or the articles manufacturer. The items locations can then be used to guide a user (customer) through the shop to find specific items, as discussed above.

Returning to FIG. 1, a system 1 for providing a guide to a user 3 for a predefined environment, exemplary a shop 2, is illustrated.

The user 3 carries an electronic device, exemplary a smartphone 4, during shopping in the shop 2. The smartphone 4 can communicate with a server 5.

Figure 2:
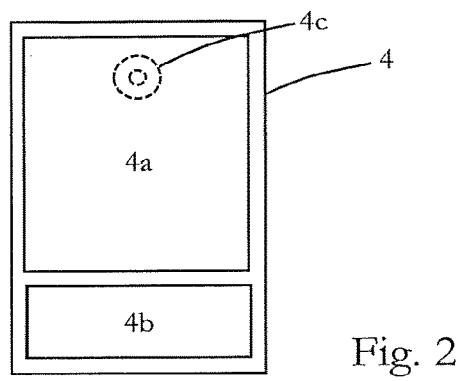
FIG. 2 illustrates a smartphone.

As can also be taken from FIG. 2, the smartphone 4 has a circuitry 4a, which may include typical sub-units of a smartphone, e.g. processor, memory, storage, network interface, radio interface, etc. The smartphone 4 also has a display 4b which is configured as a touch screen display and it has an imaging device 4c.

The server 5 has a circuitry 5a, which may include typical sub-units for a server, e.g. processor, memory, storage, network interface, etc. Moreover, the server 5 has a databank 5b for storing respective data.

The shop 2 has several shelves 6a, 6b and 6c distributed in the shop 2. On the shelves 6a, 6b and 6c several items 7 (products) are located, wherein some of them, namely items 8a, 8b and 8c will be purchased by the user 3.

Additionally, a point-of-sale device 9 is provided in the shop 2, which can also communicate with the smartphone 4 and the server 5.

An indoor positioning system is provided having several antennas 10a, 10b and 10c which are located in the shop 2. The smartphone 4 can track its location within the shop 2 with the aid of the indoor positioning system and the antennas 10a, 10b and 10c. The indoor positioning system exemplary employs a wireless network and the location of the smartphone 4 is determined based on a reception strength between the smartphone 4 and the antennas 10a, 10b and 10c and the knowledge of the location within the shop 2 of the antennas 10a, 10b and 10c.

The server 5 has map data representing a map 11 of the shop 2. A grid 12 is overlaid over the map 11 such that the map 11 is divided into multiple map cells 13.

During movement of the user 3 with the smartphone 4, the way or "track" 14 of the user 3 is tracked by the smartphone 4, such that respective location tracking information is collected which represents the track 14 of the user 3.

During the way through the shop 2, the user 3 takes item 8a from shelf 6a, item 8b from shelf 6b and item 8c from shelf 6c into a trolley 15.

At the point-of-sale device 9, the user 3 purchases the items 8a, 8b and 8c and a cashier, for example (not shown), scans the barcode of items 8a, 8b and 8c. By scanning the items 8a, 8b and 8c, the point-of-sale device 9 recognizes the items 8a, 8b and 8c and provides respective item list data 16 to the server 5a. The item list data 16 represents the items 8a, 8b and 8c purchased by the user 3.

Moreover, at the moment of purchasing, the smartphone 4 communicates with the point-of-sale device 9 and in response to that, the smartphone 4 provides location tracking information 17 representing the track 14 to the server 5.

The server 5 analyzes the location tracking information 17, e.g. by mapping the location tracking information 17 to the map 11 being divided into map cells 13, and determines which map cells 13 are crossed by the track 14 being represented by the location tracking information 17.

The server 5 stores the item list data 16 together with the location tracking information 17 and/or the map cells 13 being crossed by track 14 in the database 5b.

Then, the server 5 calculates the correlation between the location tracking information 17, e.g. based on the map cells 13 being crossed by track 14, and the items represented by the time list data 16, as discussed above. As the server 5 has performed this calculation of the correlation already with previous location tracking information and item list data, the location of items 8a, 8b and 8c, for example, can be determined, or at least, as discussed above, a most probable location for each of the items 8a, 8b and 8c can be determined, as discussed above, and the server 5 stores this in database 5b.

Figure 3:
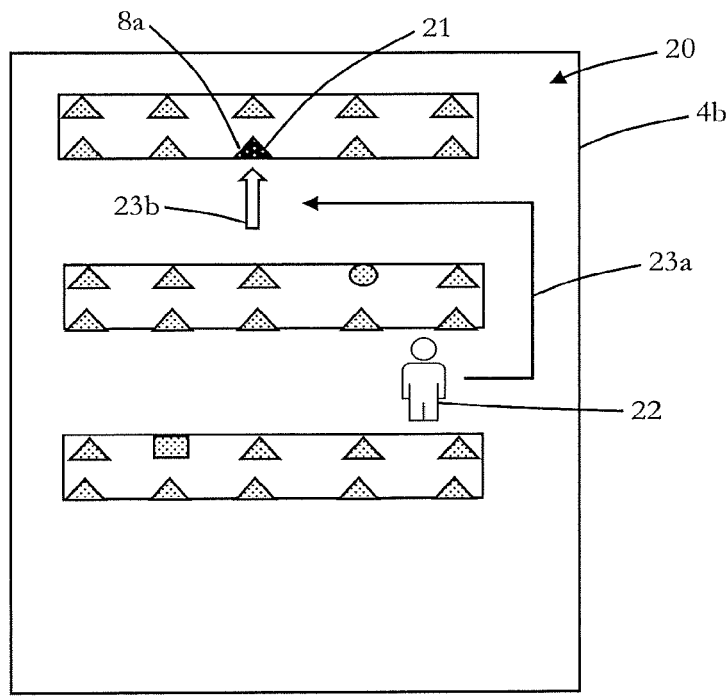
FIG. 3 illustrates a map guiding a user in a shop.

FIG. 3 illustrates how the user 3 can be guided, when he, for example, comes back to shop 2 at a later point of time and wants to purchase item 8a.

On the display 4b of the smartphone 4, a map 20 is displayed representing the shop 2 and displaying the shelves 6a, 6b and 6c and items 7 and 8a, 8b and 8c. The map 20 may be stored in the smartphone 4, or it may be obtained, for example, from server 5.

The user 3 inputs the item 8a into an application running on the smartphone 4 and the smartphone 4 communicates in response to this input with the server 5. The server 5 provides the location of the item 8a to the smartphone 4.

The location of the item 8a is displayed on the display 4b by displaying a graphical representation 21 of item 8a in the map 20 displayed on the display 4b. The graphical representation 21 of item 8a differs from graphical representations of other items displayed in the map 20, in order to visualize to the user 3 that item 8a is located at the location where the graphical representation 21 is displayed in map 20.

The smartphone 4 determines the present location of the smartphone 4, and, thus, of user 3 carrying smartphone 4, in the shop 2 and displays the location of the user 3 in the shop 2 as a graphical representation 22 in the map 20 displayed on display 4b. Thereby, the user 3 can recognize his location in the shop 2 on the basis of the graphical representation 22 being displayed in the map 20 on display 4b.

Furthermore, the smartphone 4 determines, based on the location of the user 3/smartphone 4 and the location of item 8a, a path which could be taken by user 3 in the shop 2 in order to get to the location of item 8a and displays graphical representations 23a and 23b as arrows showing directions and a way to get to the item 8a.

In other embodiments, the smartphone 4 may take an image with the imaging device 4c and may display the image on display 4b and may overlay the graphical representations 21 and 23a and 23b over the real world image, thereby guiding user 3 to the location of item 8a.

Figure 4:
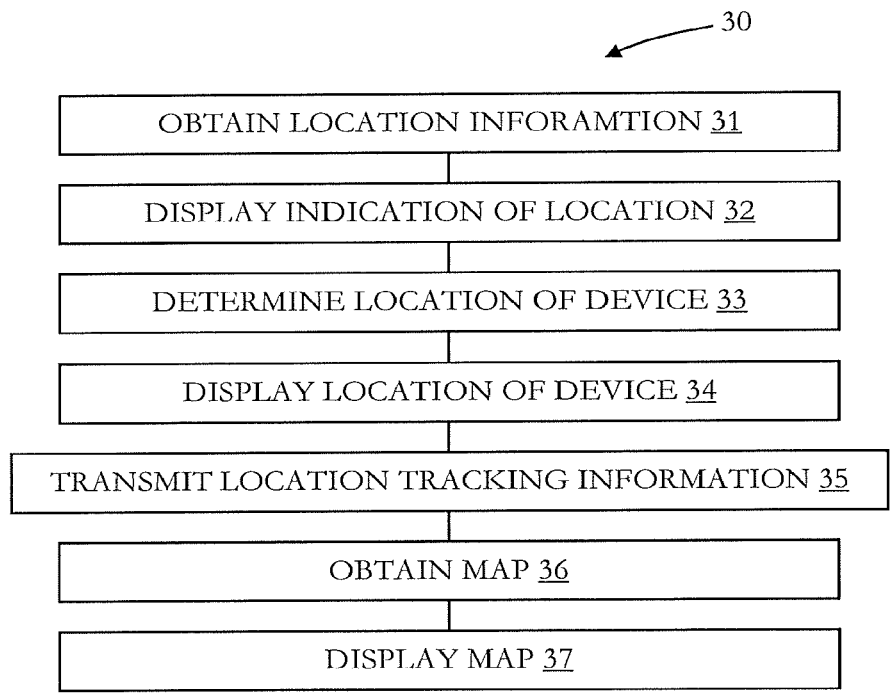
FIG. 4 is a flow diagram which can be executed by an electronic device of the system of FIG. 1.

A method 30 for controlling an electronic device, such as smartphone 4, discussed above, is described in the following under reference of FIG. 4. The method can also be implemented as a computer program causing a computer and/or a circuitry (or processor), such as circuitry 4a discussed above, to perform the method, when being carried out on the computer and/or circuitry (or processor). In some embodiments, also a non-transitory computer-readable recording medium is provided that stores therein a computer program product, which, when executed by a circuitry (or processor) causes the method described to be performed.

At 31, location information of a specific item of multiple items located in a predefined environment is obtained, as discussed above. The location information of the specific item is obtained based on a correlation between location tracking information of electronic devices moving in the predefined environment and item list data representing items being purchased by users of the electronic devices for which the location tracking information has been provided, as discussed above.

At 32, an indication of the location of the specific item is displayed, e.g. on the display 4b, as described above.

At 33, the location of the electronic device is determined, as described above.

At 34, the location of the electronic device is displayed, e.g. on the display 4b, as described above.

At 35, location tracking information is transmitted, e.g. to a server 5, as described above.

At 36, a map of the predefined environment is obtained and at 37 displayed, e.g. on the display 4b, as described above.

Figure 5:
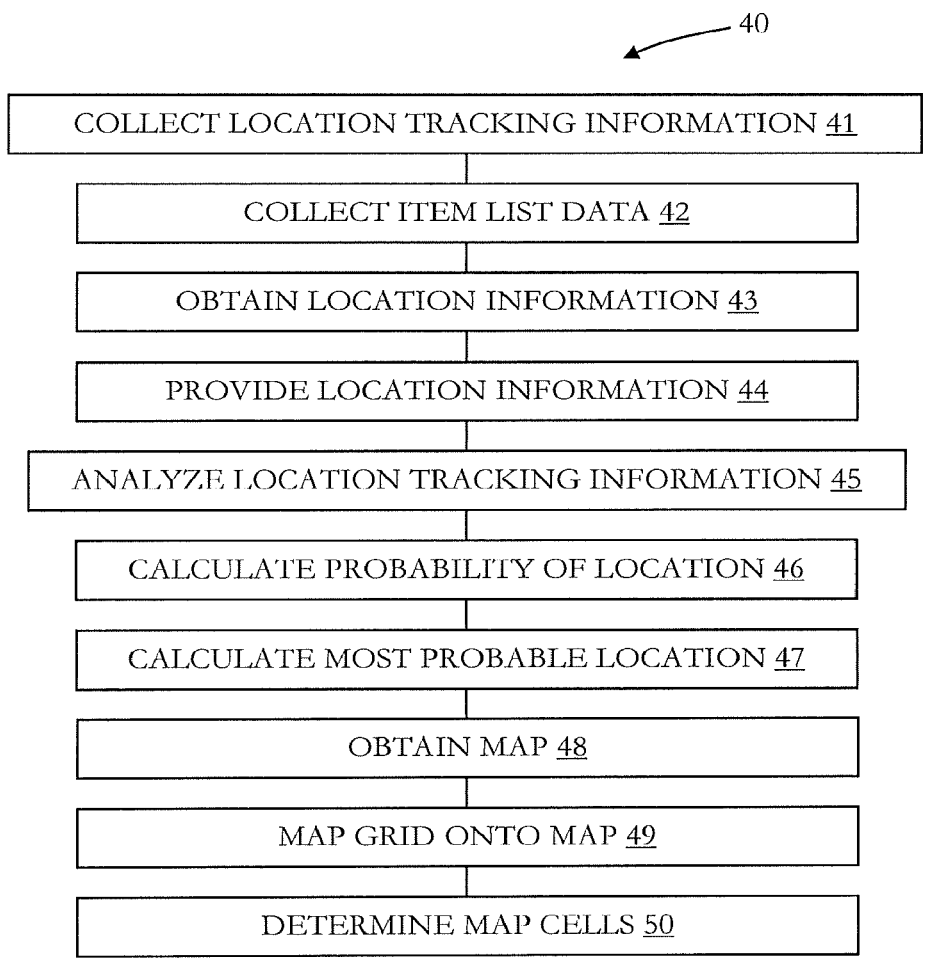
FIG. 5 is a flow diagram which can be executed by an apparatus (server) of the system of FIG. 1.

A method 40 for controlling an apparatus, such as server 5, discussed above, is described in the following under reference of FIG. 5. The method can also be implemented as a computer program causing a computer and/or a circuitry (or processor), such as circuitry 5a discussed above, to perform the method, when being carried out on the computer and/or circuitry (or processor). In some embodiments, also a non-transitory computer-readable recording medium is provided that stores therein a computer program product, which, when executed by a circuitry (or processor) causes the method described to be performed.

At 41, location tracking information from multiple electronic devices moving in a predefined environment is collected, as described above.

At 42, item list data are collected representing items which have been purchased by users of the electronic devices for which the location tracking information is collected, as described above.

At 43, location information of a specific item is obtained represented by the item list data by correlating the location tracking information with the item list data, as described above.

At 44, the location information is provided to a client electronic device, as described above.

At 45, the location tracking information is analyzed, as described above. The analyzing may include at least one of: detecting common locations in the collected tracking information, detecting locations where the electronic devices stayed for a predetermined time period, and detecting a change in a movement direction, as described above.

At 46, a probability of the location of the specific item is calculated, as described above.

As discussed, the calculation of the probability may be based on the formula:

$$S_i(l) = \frac{P(i, l)}{P(i)P(l)} = \frac{C(i, l)}{C(l)} \cdot \frac{C(.)}{C(i)}$$

wherein $S_i(l)$ is the probability of a location of the specific item i, P(i,l) is the probability that a user purchases the specific item i and passes the location l, P(i) is the probability that a user purchases the specific item i, C(i,l) is the number of users having purchased the specific item i and having passed the location l, C(i) is the number of users having purchased the item I, C(l) is the number of users having passed the location l, and C(.) is the total number of users.

At 47, as also discussed above, the most probable location of the specific item i is calculated based on the formula:

$$\operatorname{argmax}_l \frac{C(i, l)}{C(l)}$$

At 48, a map of the predefined environment is obtained, as described above.

At 49, a grid is mapped onto the map, thereby dividing the map into a plurality of map cells, as described above.

At 50, it is determined in which map cells a specific electronic device has been located (i.e. which cells have been crossed by a track or path taken by an electronic device for which the location tracking information has been collected), based on the location tracking information, as described above.

It should be recognized that the embodiments describe methods with an exemplary ordering of method steps. The specific ordering of method steps is however given for illustrative purposes only and should not be construed as binding.

Figure 6:
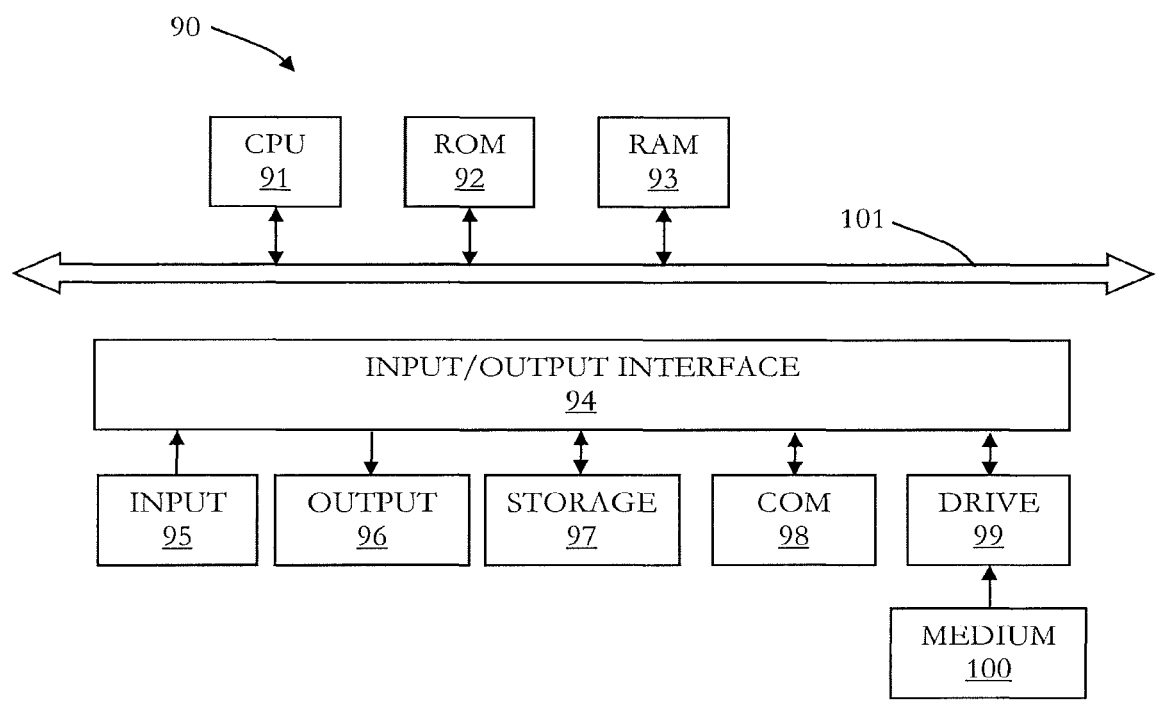
FIG. 6 illustrates a multi-purpose computer.

In the following, an embodiment of a general purpose computer 90 is described under reference of FIG. 6. The computer 90 can be such implemented that it can basically function as an electronic device, e.g. smartphone 4, as an apparatus, e.g. server 5, or as a point-of-sale device 9, as described herein. The computer has components 91 to 100, which can form a circuitry, such as anyone of the circuitries of die electronic device or apparatus described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as an apparatus described herein.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising a display and circuitry, the circuitry configured to:

obtain location information of a specific item of multiple items located in an environment, wherein the location information of the specific item is obtained based on a correlation between location tracking information of electronic devices moving in the environment and item list data representing items of the multiple items being purchased by users of the electronic devices for which the location tracking information has been provided; and display an indication of the location of the specific item on the display.

(2) The electronic device of (1), wherein the circuitry is further configured to determine the location of the electronic device.

(3) The electronic device of (1) or (2), wherein the circuitry is further configured to display the location of the electronic device on the display.

(4). The electronic device of (2), wherein the circuitry is further configured to transmit location tracking information to a server.

(5) The electronic device of anyone of (1) to (4), wherein the circuitry is further configured to obtain a map of the environment and to display the map on the display.

(6) An apparatus comprising circuitry, the circuitry configured to:
collect location tracking information from multiple electronic devices moving in an environment;
collect item list data representing items of the multiple items which have been purchased by users of the electronic devices for which the location tracking information is collected; and
obtain location information of a specific item represented by the item list data by correlating the location tracking information with the item list data.

(7) The apparatus of (6), wherein the circuitry is further configured to provide the location information to a client electronic device.

(8) The apparatus of (6) or (7), wherein the circuitry is further configured to analyze the location tracking information.

(9) The apparatus of (8), wherein the analyzing includes detecting common locations in the collected tracking information.

(10) The apparatus of (8) or (9), wherein the analyzing includes detecting locations where the electronic devices stayed for a predetermined time period.

(11) The apparatus of anyone of (8) to (10), wherein the analyzing includes detecting a change in a movement direction.

(12) The apparatus of anyone of (6) to (11), wherein the circuitry is further configured to calculate a probability of the location of the specific item.

(13) The apparatus of (12), wherein the calculation of the probability is based on the formula:

$$S_i(l) = \frac{P(i, l)}{P(i)P(l)} = \frac{C(i, l)}{C(l)} \cdot \frac{C(.)}{C(i)}$$

wherein $S_i(l)$ is the probability of a location of the specific item i, $P(i,l)$ is the probability that a user purchases the specific item i and passes the location l, $P(i)$ is the probability that a user purchases the specific item i, $C(i,l)$ is the number of users having purchased the specific item i and having passed the location l, $C(i)$ is the number of users having purchased the item i, $C(l)$ is the number of users having passed the location l, and $C(.)$ is the total number of users.

(14) The apparatus of (13), wherein the circuitry is further configured to calculate the most probable location of the specific item i based on the formula:

$$\operatorname{argmax}_l \frac{C(i, l)}{C(l)}$$

(15) The apparatus of anyone of (6) to (14), wherein the circuitry is further configured to obtain a map of the environment.

(16) The apparatus of (15), wherein the circuitry is further configured to map a grid onto the map, thereby dividing the map into a plurality of map cells.

(17) The apparatus of (16), wherein the circuitry is further configured to determine in which map cells a specific electronic device has been located, based on the location tracking information.

(18) A system, comprising:
multiple client electronic devices, in particular in accordance with anyone of (1) to (5), comprising a display and circuitry, the circuitry configured to:
obtain location information of a specific item of multiple items located in an environment, wherein the location information of the specific item is determined based on a correlation between location tracking information of electronic devices moving in the environment and item list data representing items of the multiple items being purchased by users of the electronic devices for which the location tracking information has been provided, and
display an indication of the location of the specific item on the display; and
a server apparatus, in particular in accordance with anyone of (6) to (17), comprising circuitry, the circuitry configured to:
collect location tracking information from the multiple client electronic devices moving in the environment;
collect item list data representing items of the multiple items which have been purchased by users of the electronic devices for which the location tracking information is collected;
obtain location information of a specific item represented by the item list data by correlating the location tracking information with the item list data, and
provide the location information to the client electronic devices.

(19) The system of (18), further comprising a point-of-sale device, wherein the point-of-sale device is configured to provide the item list data to the server apparatus.

(20) The system of (19), wherein the point-of-sale device is configured to link the location tracking information to the item list data.

The present application claims priority to European Patent Application 16178498.8 filed by the European Patent Office on 7 Jul. 2016, the entire contents of which being incorporated herein by reference.

The invention claimed is:

1. An electronic device comprising a display and circuitry, the circuitry configured to:
obtain location information of a specific item of multiple items located in an environment according to information provided by users of electronic devices within the environment, wherein the location information of the specific item is obtained based on:
a calculated probability the specific item is located at a specific location according to a number of users having purchased the specific item and having passed the specific location, a number of users having purchased the specific item, a number of users having passed the specific location, and a total number of users; and
a correlation between location tracking information of the electronic devices moving in the predefined environment and item list data representing items of the multiple items being purchased by users of the electronic devices for which the location tracking information has been provided;

display an indication of the location of the specific item on the display based on the obtained location information;

generate a navigation path from a current location of the electronic device to the location of the specific item based on the current location of the electronic device and the obtained location information of the specific item to guide a user of the electronic device to the specific item.

2. The electronic device of claim 1, wherein the circuitry is further configured to determine the location of the electronic device.

3. The electronic device of claim 2, wherein the circuitry is further configured to display the location of the electronic device on the display.

4. The electronic device of claim 2, wherein the circuitry is further configured to transmit location tracking information to a server.

5. The electronic device of claim 1, wherein the circuitry is further configured to obtain a map of the environment and to display the map on the display.

6. An apparatus comprising circuitry, the circuitry configured to:

collect location tracking information from multiple electronic devices moving in an environment;

collect item list data representing items of the multiple items which have been purchased by users of the electronic devices for which the location tracking information is collected;

obtain location information of a specific item represented by the item list data by:

calculating a probability the specific item is located at a specific location according to a number of users having purchased the specific item and having passed the specific location, a number of users having purchased the specific item, a number of users having passed the specific location, and a total number of users; and correlating the location tracking information with the item list data; and outputting the obtained location information of the specific item to a client electronic device, wherein the client electronic device is configured to generate a navigation path from a current location of the client electronic device to the location of the specific item based on the current location of the client electronic device and the obtained location information of the specific item to guide a user of the client electronic device to the specific item.

7. The apparatus of claim 6, wherein the circuitry is further configured to analyze the location tracking information.

8. The apparatus of claim 7, wherein the analyzing includes detecting common locations in the collected tracking information.

9. The apparatus of claim 7, wherein the analyzing includes detecting locations where the electronic devices stayed for a predetermined time period.

10. The apparatus of claim 7, wherein the analyzing includes detecting a change in a movement direction.

11. The apparatus of claim 6, wherein the calculation of the probability is based on the formula:

$$S_i(l) = \frac{P(i, l)}{P(i)P(l)} = \frac{C(i, l)}{C(l)} \cdot \frac{C(.)}{C(i)}$$

wherein $S_i(l)$ is the probability of a location of the specific item i, $P(i,l)$ is the probability that a user purchases the specific item i and passes the location l, $P(i)$ is the probability that a user purchases the specific item i, $C(i,l)$ is the number of users having purchased the specific item i and having passed the location l, $C(i)$ is the number of users having purchased the item i, $C(l)$ is the number of users having passed the location l, and $C(.)$ is the total number of users.

12. The apparatus of claim 11, wherein the circuitry is further configured to calculate the most probable location of the specific item i based on the formula:

$$\mathrm{argmax}_l \frac{C(i, l)}{C(l)}$$

13. The apparatus of claim 6, wherein the circuitry is further configured to obtain a map of the environment.

14. The apparatus of claim 13, wherein the circuitry is further configured to map a grid onto the map, thereby dividing the map into a plurality of map cells.

15. The apparatus of claim 14, wherein the circuitry is further configured to determine in which map cells a specific electronic device has been located, based on the location tracking information.

16. A system, comprising:

multiple client electronic devices comprising a display and circuitry, the circuitry configured to:

obtain location information of a specific item of multiple items located in an environment according to information provided by users of the client electronic devices within the environment, wherein the location information of the specific item is determined based on:

a calculated probability the specific item is located at a specific location according to a number of users of client electronic devices having purchased the specific item and having passed the specific location, a number of users having purchased the specific item, a number of users having passed the specific location, and a total number of users; and a correlation between location tracking information of electronic devices moving in the environment and item list data representing items of the multiple items being purchased by users of the client electronic devices for which the location tracking information has been provided, and display an indication of the location of the specific item on the display; and a server apparatus comprising circuitry, the circuitry configured to:

collect location tracking information from the multiple client electronic devices moving in the environment;

collect item list data representing items of the multiple items which have been purchased by users of the electronic devices for which the location tracking information is collected;

obtain location information of a specific item represented by the item list data by correlating the location tracking information with the item list data; and provide the location information to the client electronic devices, wherein at least one of the client electronic device is configured to generate a navigation path from a current location of the at least one client electronic device to the location of the specific item based on the current location of the client electronic device and the obtained location information of the specific item to guide a user of the client electronic device to the specific item.

17. The system of claim 16, further comprising a point-of-sale device, wherein the point-of-sale device is configured to provide the item list data to the server apparatus.

18. The system of claim 17, wherein the point-of-sale device is configured to link the location tracking information to the item list data.

* * * * *